(12) United States Patent
Kim

(10) Patent No.: US 6,859,675 B1
(45) Date of Patent: Feb. 22, 2005

(54) SEMICONDUCTOR FACTORY AUTOMATION SYSTEM AND METHOD FOR MONITORING AT LEAST ONE SERVER IN REAL TIME

(75) Inventor: Young-Jin Kim, Ichon (KR)

(73) Assignee: Hyundai Electronics Industries Co., Ltd., Ichon-shi (KR)

( * ) Notice: Subject to any disclaimer, the term of this patent is extended or adjusted under 35 U.S.C. 154(b) by 714 days.

(21) Appl. No.: 09/599,475

(22) Filed: Jun. 22, 2000

(30) Foreign Application Priority Data

Jun. 22, 1999 (KR) ...................................... 1999-23538

(51) Int. Cl.$^7$ .............................................. G06F 19/00
(52) U.S. Cl. ....................... 700/108; 700/95; 700/108
(58) Field of Search ........................... 700/2, 9, 83, 95, 700/108, 110, 121; 714/10, 47, 57; 702/188; 345/734, 736, 961; 709/224; 710/15, 17–19

(56) References Cited

U.S. PATENT DOCUMENTS

| | | | |
|---|---|---|---|
| 4,571,685 A | 2/1986 | Kamoshida | 364/468 |
| 4,901,242 A | 2/1990 | Kotan | 364/468 |
| 5,111,404 A | 5/1992 | Kotani | 364/468 |
| 5,231,585 A | 7/1993 | Kobayashi et al. | 364/468 |
| 5,375,062 A | 12/1994 | Aoki | 364/468 |
| 5,402,349 A | 3/1995 | Fujita et al. | 364/468 |
| 5,432,715 A | 7/1995 | Shigematsu et al. | 364/551.01 |
| 5,440,493 A | 8/1995 | Doida | 364/468 |
| 5,495,417 A | 2/1996 | Fuduka et al. | 364/468 |
| 5,555,179 A | 9/1996 | Koyama et al. | 364/468.01 |
| 5,568,408 A | 10/1996 | Maeda | 364/580 |
| 5,579,231 A | 11/1996 | Sudou et al. | 364/468.01 |
| 5,596,712 A | 1/1997 | Tsuyama et al. | 395/183.02 |
| 6,054,987 A * | 4/2000 | Richardson | 345/734 |
| 6,473,664 B1 * | 10/2002 | Lee et al. | 700/110 |
| 6,505,248 B1 * | 1/2003 | Casper et al. | 709/224 |

FOREIGN PATENT DOCUMENTS

| | | |
|---|---|---|
| CN | 344477 | 11/1998 |
| EP | 0 292 236 A2 | 5/1988 |
| EP | 0623878 A2 | 3/1994 |
| EP | 0913774 A2 | 5/1999 |
| GB | 2236202 | 3/1991 |
| TW | 344477 | 11/1986 |
| WO | WO 00/62138 A1 | 10/2000 |
| WO | WO 00/68795 A1 | 11/2000 |
| WO | WO 00/77648 A1 | 12/2000 |

OTHER PUBLICATIONS

Automation Production Systems, and Computer Integrated Manufacturing; pp. 477–479, 1991.

* cited by examiner

Primary Examiner—Leo Picard
Assistant Examiner—Steven R. Garland
(74) Attorney, Agent, or Firm—Mayer, Brown, Rowe & Maw LLP

(57) ABSTRACT

A method for monitoring at least one server in a semiconductor factory automation (FA) system, includes the steps of: a) providing server state information from at least one server to a real-time database, wherein the server state information includes an availability of a central processing unit, an availability of a disk and a state of a program process related to the server; b) storing the processor state information in the real-time database; c) retrieving the server state information to monitor the server; and d) displaying the server state information retrieved. Therefore, the method monitors at least one server in a real time so that an operator can easily locate a failure of at least one-server.

13 Claims, 5 Drawing Sheets

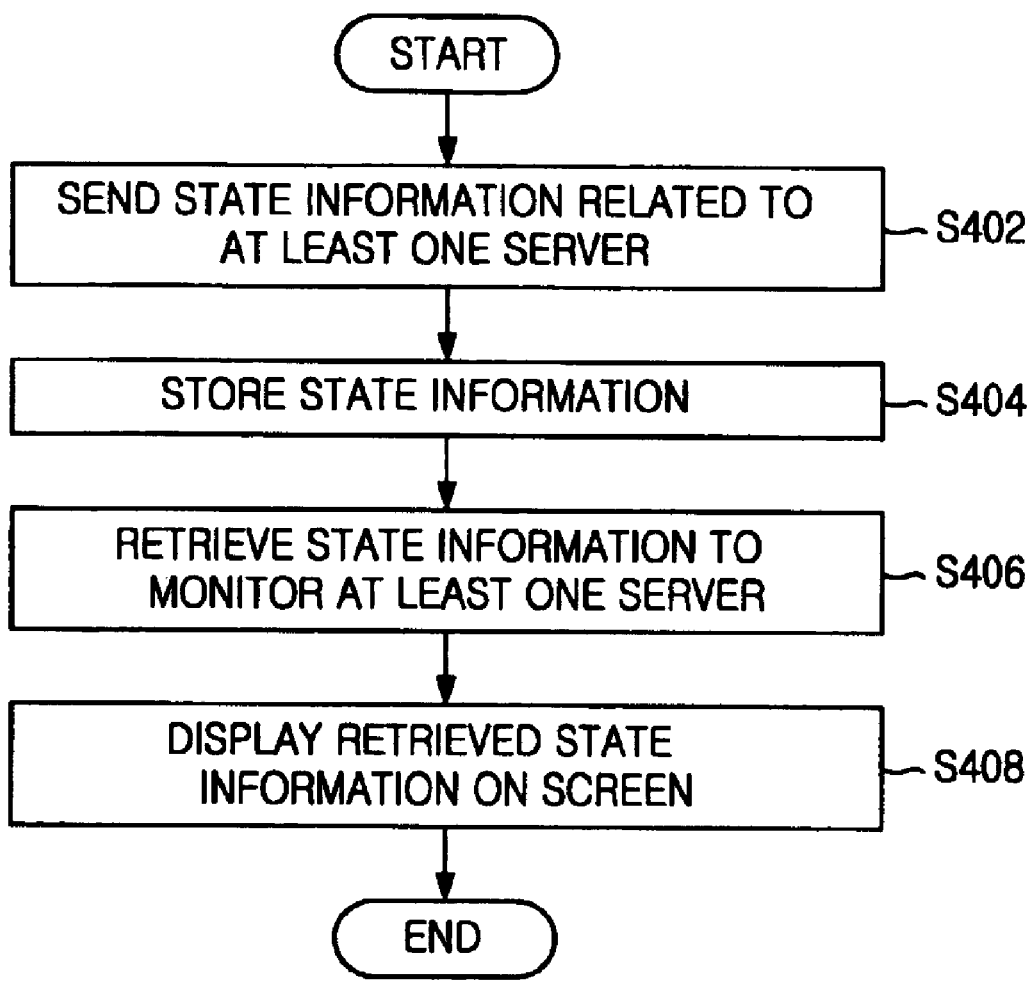

ical FA system automatically processes semiconductor wafers in order to produce semiconductor device, e.g., memory devices. The conventional semiconductor FA system includes process equipments (hereinafter, referred to as EQs), stockers and an automatic guide vehicle (hereinafter, referred to as AGV). An EQ applies a semiconductor process to the semiconductor wafers.

SEMICONDUCTOR FACTORY AUTOMATION SYSTEM AND METHOD FOR MONITORING AT LEAST ONE SERVER IN REAL TIME

FIELD OF THE INVENTION

The present invention relates to a semiconductor factory automation (hereinafter, referred to as FA) system; and, more particularly, to a semiconductor FA system and method for monitoring at least one server in a real time.

DESCRIPTION OF THE PRIOR ART

Generally, a conventional semiconductor FA system automatically processes semiconductor wafers in order to produce semiconductor device, e.g., memory devices. The conventional semiconductor FA system includes process equipments (hereinafter, referred to as EQs), stockers and an automatic guide vehicle (hereinafter, referred to as AGV). An EQ applies a semiconductor process to the semiconductor wafers.

A stocker stocks a semiconductor wafer cassette containing the semiconductor wafers to be processed in the EQ. Further, the stocker also stocks the semiconductor wafer cassette, which has been already processed in the EQ.

The AGV transports the semiconductor wafer cassette to be processed from the EQ to another EQ or the stocker. Furthermore, the AGV transports the processed semiconductor wafer cassette from the EQ to the stocker.

In order to automatically control the above elements, e.g., the EQs, the stocker, the AGV and the like, the conventional semiconductor FA system also includes a number of control servers, e.g., an operator interface server (hereinafter, referred to as OIS), an EQ server (hereinafter, referred to as EQS) and the like.

The control servers employed in the conventional semiconductor FA system have been implemented by using, e.g., software programs contained in a large scale computer or distributed in a number of personal computers constituting of a client-server system.

In the client-sever system, a number of personal computers are coupled to a common communication line, e.g., Ethernet™ supplied by Xerox Corporation. Each personal computer includes one or more software programs, each for a control server. In this case, if a personal computer is in an error state, the control servers contained in the personal computer may not perform its appropriate operation. Further, the productivity of semiconductor device may be seriously affected. Therefore, the semiconductor FA system having a client-server system strongly needs a scheme capable of monitoring operational state of the servers in a real time.

SUMMARY OF THE INVENTION

It is, therefore, an object of the present invention to provide a semiconductor FA system and method for monitoring at least one server in a real time so that an operator can easily locate a failure of at least one server.

In accordance with an aspect of the present invention, there is provided a semiconductor factory automation (FA) system, comprising: at least one processor for driving a program process and providing processor state information, wherein the processor state information includes an availability of a central processing unit, an availability of a disk and a state of the program process related to said processor; a storing means for storing the processor state information in a real time; a monitoring means for retrieving the processor state information in said storing means to monitor said processor; and a displaying means for displaying the processor state information retrieved.

In accordance with another aspect of the present invention, there is provided a method for monitoring at least one server in a semiconductor factory automation (FA) system, comprising the steps of: a) providing server state information from at least one server to a real-time database, wherein the server state information includes an availability of a central processing unit, an availability of a disk and a state of a program process related to the server; b) storing the processor state information in the real-time database; c) retrieving the server state information to monitor the server; and d) displaying the server state information retrieved.

BRIEF DESCRIPTION OF THE DRAWINGS

The above and other objects and features of the instant invention will become apparent from the following description of preferred embodiments taken in conjunction with the accompanying drawings, in which:

FIG. 5 is a flowchart showing a method for monitoring at least one server in a real time in accordance with the present invention.

DETAILED DESCRIPTION OF THE INVENTION

Figure 1:
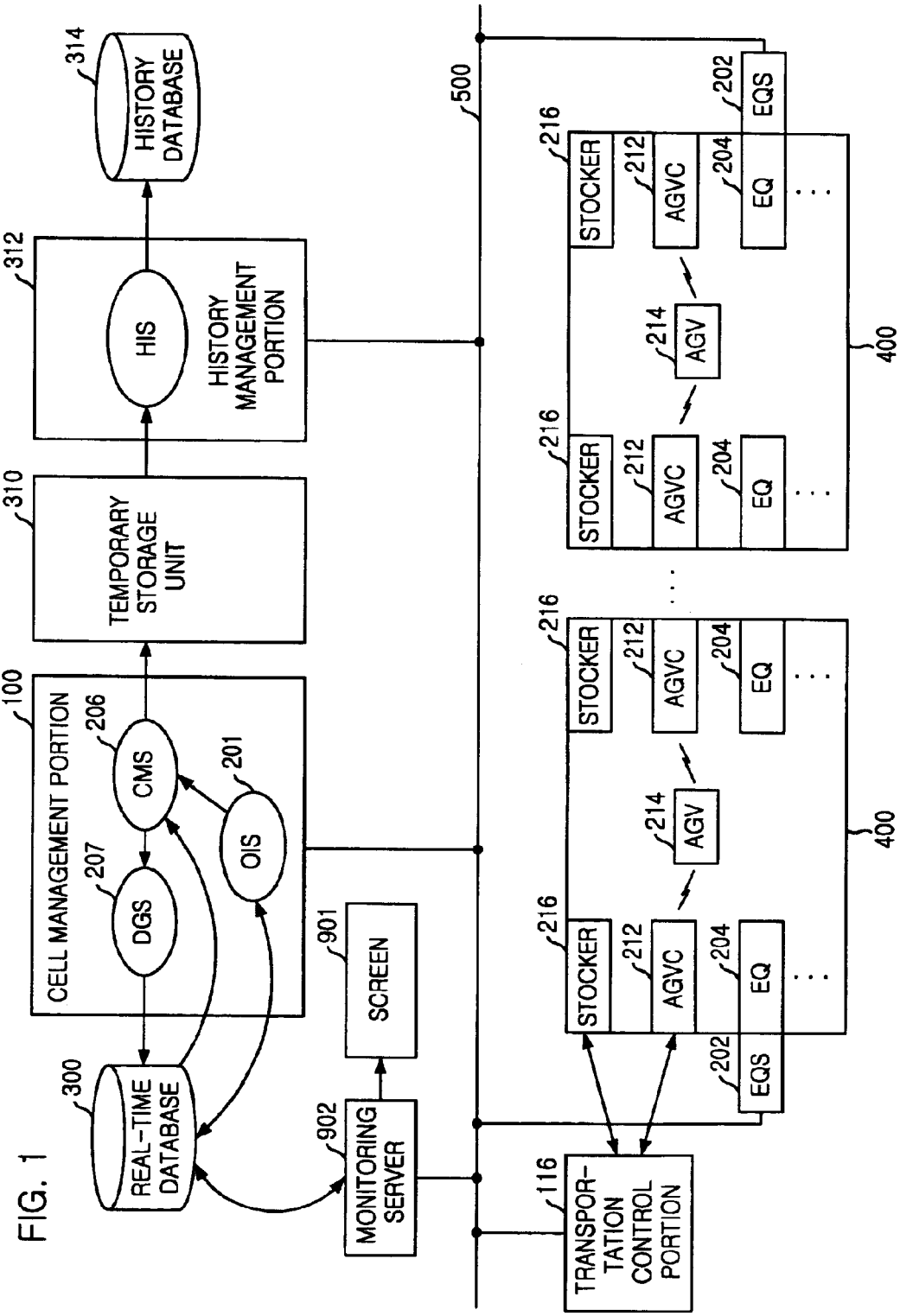
FIG. 1 is a block diagram describing a semiconductor FA system for monitoring at least one server in a real time in accordance with the present invention.

Referring to FIG. 1, there is shown a block diagram showing a semiconductor FA system for monitoring at least one server in accordance with the present invention. As shown, the semiconductor FA system includes at least one cell, which have a predetermined number, e.g., 4, of semiconductor production bays 400. A semiconductor production bay 400 is provided with EQs 204, stockers 216 and an AGV 214. The EQ 204 processes semiconductor wafers in order to obtain semiconductor devices. The EQ 204 includes, e.g., an etching equipment, a photo-lithography equipment, a furnace equipment, a physical vapor deposition (PVD) equipment, a sputtering equipment and the like. A stocker 216 temporarily stores a number of semiconductor wafer cassettes. Each of semiconductor wafer cassettes has a predetermined number of semiconductor wafers, which is referred to as a lot. The semiconductor wafer cassettes are selectively transported to the EQ 204 by using the AGV 214. The semiconductor wafer cassette stored in the stocker 216 is transported to another semiconductor production bay 400.

A process equipment server (hereinafter, referred to as EQS) 202 is coupled to a common communication line 500, e.g., Ethernet™ supplied by Xerox Corporation. An AGV controller (hereinafter, referred to as AGVC) 212 controls the AGV 214.

The semiconductor FA system also includes a cell management portion 100, a real-time database 300 connected to the cell management portion 100, a temporary storage unit 310, a history management portion 312 connected to the temporary storage unit 310 and a history database 314 connected to the history management portion 312. The cell management portion 100, the history management portion 312 and the history database 314 are respectively connected to the common communication line 500 for communication therebetween.

The cell management portion 100 includes a cell management server (CMS) 206, an operator interface server (hereinafter, referred to as OIS) 201 and a data gathering server (DGS) 207. The DGS 207 stores process data associated with the lot in the real-time database 300.

The real-time database 300 stores information related to states of servers such as the CMS 206, the DGS 207, the OIS 201 and the EQS 202. A monitoring server 902 retrieves the information related to the states of servers in a real time. A screen 901 coupled to the monitoring server 902 displays the retrieved information related to the states of server in the real time. The state information related to the servers includes an availability of a central processing unit (CPU), an availability of a disk, a state of a program process and a state of a connection port of transfer control protocol/internet protocol (hereinafter, referred to as TCP/IP). The state information further has a server identifier.

Figure 2:
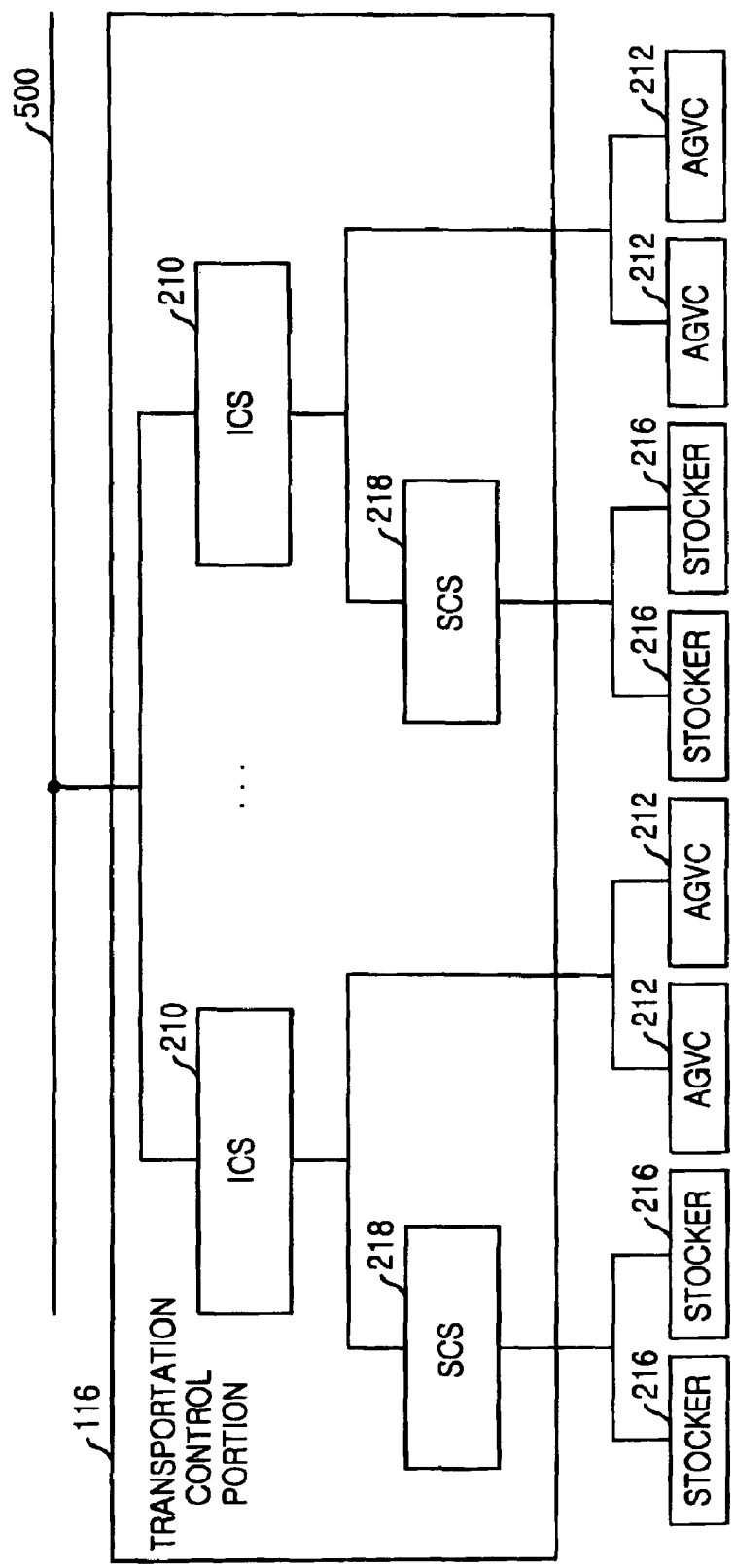
FIG. 2 is a block diagram illustrating a transportation control portion shown in FIG. 1.

Referring to FIG. 2, there is shown a block diagram illustrating a transportation control portion shown in FIG. 1. As shown, the transportation control portion 116 includes intrabay control servers (hereinafter, referred to as ICSs) 210 coupled to the common communication line 500 and stocker control servers (hereinafter, referred to as SCSs) 218. The ICS 210 converts a transportation message into a transportation command from the common communication line 500. The SCS 218 generates a stocker control command to control the stockers 216 in response to the transportation command. The AGVC 212 generates an AGV control command to control an AGV 214 in response to the transportation command.

Figure 3:
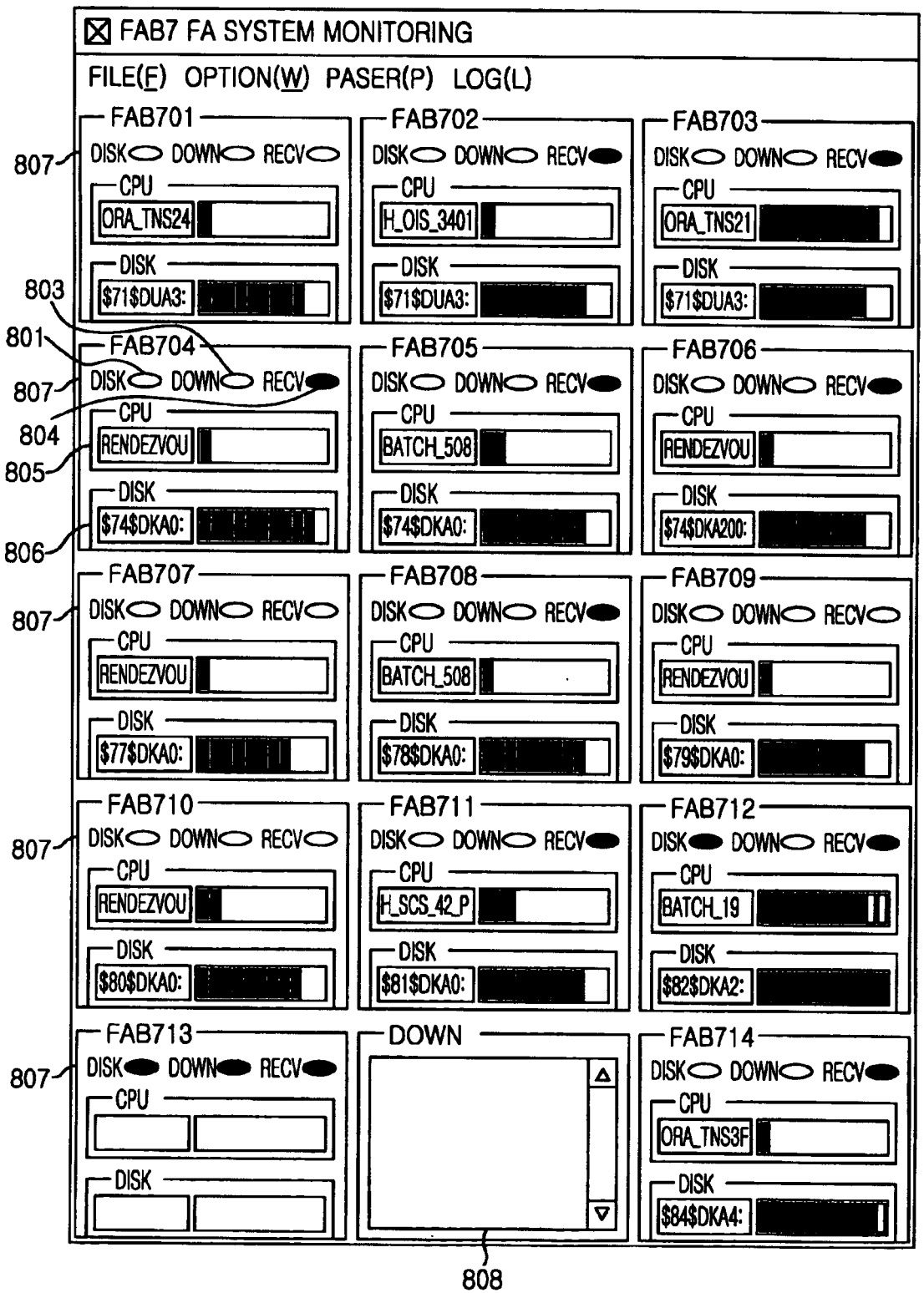
FIG. 3 is an exemplary view showing a screen shown in FIG. 1.

Referring to FIG. 3, there is shown an exemplary view showing a screen shown in FIG. 1. As shown, the screen 901 coupled to a monitoring server 902 shown in FIG. 1 displays states of servers such as the ICS 210, the SCS 218, the CMS 206, the OIS 201 and the DGS 207 shown in FIGS. 1 and 2. Display spaces 807 display a state of a corresponding server, respectively. A display space 805 displays an availability of a CPU related to the corresponding server. A display space 806 displays an availability of a disk related to the corresponding server. When the disk, related to the corresponding server, has failed, a light emitting device 801 emits a light of a red color. Further, when the disk, related to the corresponding server, has not failed, the light emitting device 801 emits a light of a green color.

When a program process related to the corresponding server is in a down state, a light emitting device 803 emits the light of the red color. Further, when the program process, related to the corresponding server, is not in the down state, the light emitting device 803 emits the light of the green color.

When a communication between the monitoring server 902 and the corresponding server is disconnected, a light emitting device 804 does not emit the light. Further, when the communication between the monitoring server 902 and the corresponding server is connected, a light emitting device 804 emits the light. A display space 808 displays a name of the program process of the down state.

Figure 4:
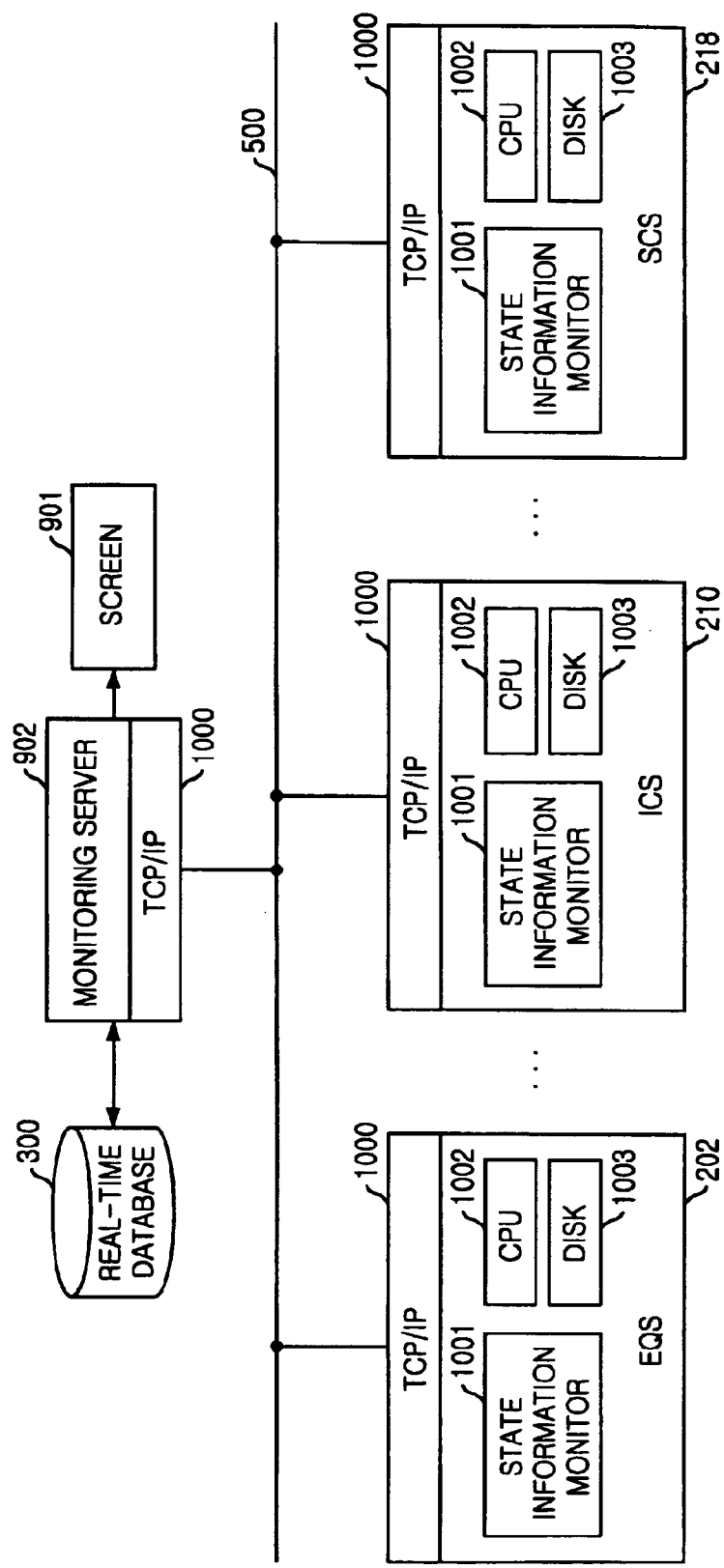
FIG. 4 is an exemplary view depicting a relationship between servers shown in FIGS. 1 and 2.

Referring to FIG. 4, there is shown an exemplary view depicting a relationship between servers shown in FIGS. 1 and 2. As shown, the monitoring server 902 has transfer control protocol/internet protocol (hereinafter, referred to as TCP/IP) 1000 to communicate with the EQS 202, the ICS 210 and the SCS 218. Similarly, the EQS 202, the ICS 210 and the SCS 218 have the TCP/IP 1000, respectively. Further, the EQS 202, the ICS 210 and the SCS 218 include a state information monitor 1001, a CPU 1002 and a disk 1003, respectively.

The state information monitor 1001 monitors an availability of the CPU 1002, an availability of the disk 1003, a program process and a connection port of the TCP/IP 1000. The state information monitor 1001 sends the availability of the CPU 1002, the availability of the disk 1003, a state of the program process and a state of the connection port of the TCP/IP 1000 to the monitoring server 902.

Referring to FIG. 5, there is shown a flowchart showing a method for monitoring at least one server in a real time in accordance with the present invention.

As shown, at step S402, the servers such as the CMS 206, the DGS 207, the OIS 201 and the EQS 202 send information related to states of the servers to the real-time database 300.

At step S404, the real-time database 300 stores the information related to the states of the servers.

At step S406, the monitoring server 902 retrieves the information related to the states of servers in a real time.

At step S408, the screen 901 displays the retrieved information related to the states of the servers in the real time. The state information related to the servers includes an availability of a CPU, an availability of a disk, a state of a connection port of TCP/IP and a state of a program process. The state information further-a server identifier.

Although the preferred embodiments of the invention have been disclosed for illustrative purposes, those skilled in the art will appreciate that various modifications, additions and substitutions are possible, without departing from the scope and spirit of the invention as disclosed in the accompanying claims.

What is claimed is:

1. A semiconductor factory automation (FA) system, comprising:

at least one processor, which is coupled to at least one semiconductor processing means for processing a semiconductor wafer cassette containing a predetermined number of semiconductor wafers, each for driving a program process and providing processor state information, wherein the processor state information includes an availability of a central processing unit related to said processor, an availability of a disk related to said processor, and a state of the program process related to said processor;

storing means for storing the processor state information in real time;

monitoring means for retrieving the processor state information stored in said storing means in order to monitor said processor in real time; and displaying means for displaying the processor state information retrieved.

2. The semiconductor FA system as recited in claim 1, wherein said displaying means includes:

a first display space for displaying the availability of the central processing unit related to said processor; and a second display space for displaying the availability of the disk related to said processor.

3. The semiconductor FA system as recited in claim 2, wherein said displaying means further includes:

a first light emitting device for emitting a first light when the disk has failed;

a second light emitting device for emitting a second light when the program process is in a down state; and a third light emitting device for emitting a third light when a communication between said monitoring means and said processor is disconnected.

4. The semiconductor FA system as recited in claim 3, wherein said displaying means further includes:

a third display space for displaying identification information of the program process of the down state.

5. The semiconductor FA system as recited in claim 4, wherein said at least one processor includes a first processor and a second processor.

6. The semiconductor FA system as recited in claim 4, further comprising:

stocking means for stocking the semiconductor wafer cassette; and transportation means for transporting the semiconductor wafer cassette from said semiconductor processing means to said stocking means or from said stocking means to said semiconductor processing means.

7. A method for monitoring at least one server in a semiconductor factory automation (FA) system, comprising the steps of:

a) providing server state information from at least one server, which is coupled to at least one semiconductor processing means, to a real-time database, wherein the server state information includes an availability of a central processing unit related to the server, an availability of a disk related to the server, and a state of a program process related to the server;

b) storing the server state information in the real-time database;

c) retrieving the server state information stored in the real-time database to monitor the server, and d) displaying the server state information retrieved in real time.

8. The method as recited in claim 7, wherein said step d) includes the steps of:

d1) displaying the availability of the central processing unit related to the server; and d2) displaying the availability of the disk related to the server.

9. The method as recited in claim 8, wherein said step d) further includes the steps of:

d3) emitting a first light when the disk has failed; and d4) emitting a second light when the program process is in a down state.

10. The method as recited in claim 9, wherein said step d) further includes the step of:

d5) displaying identification information of the program process of the down state.

11. A semiconductor factory automation (FA) system, comprising:

a plurality of processors, each coupled to a plurality of semiconductor processing means for processing a semiconductor wafer cassette containing a predetermined number of semiconductor wafers, said plurality of processors for driving a plurality of program processes, respectively, and providing respective processor state information, wherein for each of said plurality of processors the processor state information respectively includes an availability of a central processing unit related to said processor, an availability of a disk related to said processor, and a state of the program process related to said processor;

storing means for storing the processor state information of said plurality of processors in real time;

monitoring means for retrieving the processor state information stored in said storing means in order to monitor said plurality of processors in real time; and displaying means for displaying the processor state information retrieved, said displaying means including, for each processor, a first display space for displaying the availability of the central processing unit related to said processor; and a second display space for displaying the availability of the disk related to said processor.

12. The semiconductor FA system as recited in claim 11, wherein said displaying means further includes, for each processor:

a first light emitting device for emitting a first light when the respective disk has failed;

a second light emitting device for emitting a second light when the respective program process is in a down state; and a third light emitting device for emitting a third light when a communication between said monitoring means and said respective processor is disconnected.

13. The semiconductor FA system as recited in claim 12, wherein said displaying means further includes, for each processor:

a third display space for displaying identification information of the program process of the down state.

* * * * *